H. BELDING.
EXPANSION BUSHING.
APPLICATION FILED MAR. 19, 1918.

1,304,250.

Patented May 20, 1919.

Harry Belding

WITNESSES

UNITED STATES PATENT OFFICE.

HARRY BELDING, OF LOS ANGELES, CALIFORNIA.

EXPANSION-BUSHING.

1,304,250.  Specification of Letters Patent.  Patented May 20, 1919.

Application filed March 19, 1918. Serial No. 223,450.

*To all whom it may concern:*

Be it known that I, HARRY BELDING, a citizen of the United States, residing at Los Angeles, in the county of Los Angeles and State of California, have invented new and useful Improvements in Expansion-Bushings, of which the following is a specification.

My object is to make an expansion bushing, and my invention consists of the novel features herein shown, described and claimed.

My expansion bushing is especially adapted for locking or attaching an electric conduit pipe to the outlet box without the use of a separate lock nut.

Figure 1:
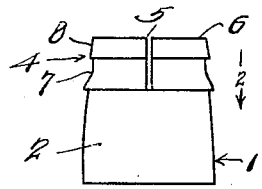
Figure 1 is an elevation of an expansion bushing embodying the principles of my invention.
Figure 2:
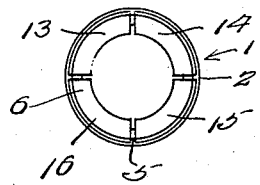
Fig. 2 is a plan view looking in the direction indicated by the arrow 2 in Fig. 1.
Figure 3:
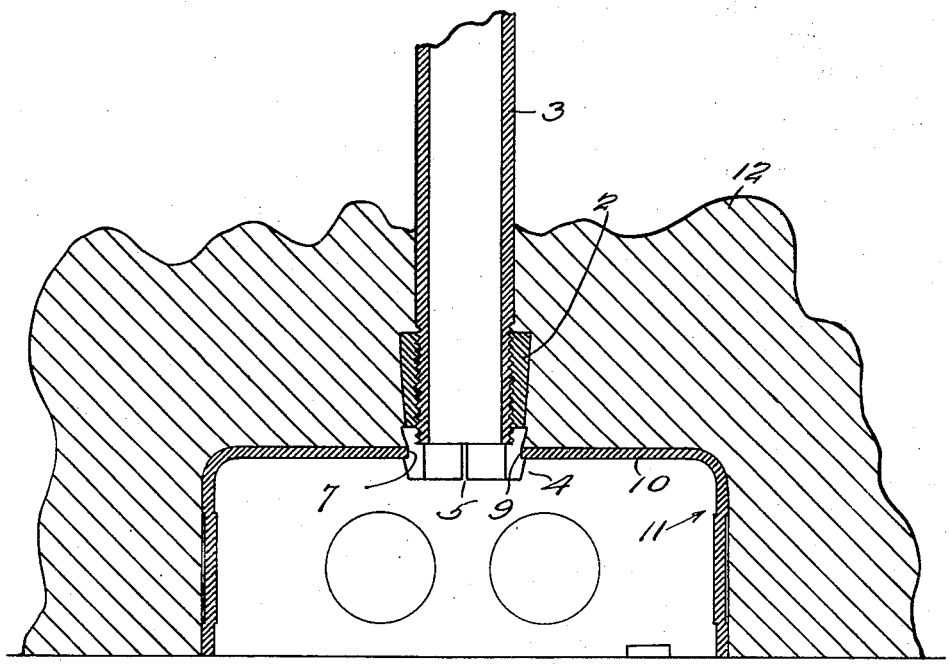
Fig. 3 is a sectional detail showing the bushing in use connecting an electric conduit pipe to an outlet box.

Referring to the drawings in detail the bushing 1 has a circular internally screw threaded portion 2 into which the electric conduit pipe 3 may be firmly screwed. The expanding portion 4 of the bushing is formed integral with the portion 2, and has longitudinal radial slots 5 extending from its free end face 6, an annular groove 7 in its outer face, and an annular beveled face 8 extending from the end face 6 to the groove 7.

The expansion bushing thus constructed is loosely screwed upon the end of the electric conduit pipe 3; then the outlet box is placed against the end of the bushing with the beveled face 8 extending into the opening 9 in the wall 10 of the outlet box 11; then the box is driven upon the bushing until the edge of the wall engages in the groove 7; then a wrench is applied to the portion 2 of the bushing and the bushing is screwed firmly upon the conduit pipe 3 until the pipe passes through the portion 2 and expands the tongues 13, 14, 15 and 16 until the bushing tightens in the opening in the outlet box. Then the plaster 12 may be applied around the bushing and outlet box.

Various changes may be made without departing from the spirit of my invention as claimed.

I claim:

An expansion bushing comprising a circular internally screw threaded portion, a second portion extending from one end of the screw threaded portion and having a smooth outer face and an external groove and a beveled face leading to the groove and radial slots crosswise of the groove.

HARRY BELDING.